Sept. 20, 1955 T. HARRIS 2,718,444
PISTON SEAL
Filed March 19, 1953

INVENTOR.
Thomas Harris
BY
Barlow & Barlow
ATTORNEYS.

United States Patent Office

2,718,444
PISTON SEAL

Thomas Harris, Warwick, R. I., assignor to Harris & Stevenson Engineering & Development Co., Inc., a corporation of Rhode Island Application March 19, 1953, Serial No. 343,317

2 Claims. (Cl. 309—23)

This invention relates to a hydraulic piston, particularly a seal therefor.

An object of the invention is to provide a piston seal adapted to be moved under fluid pressure into sealing contact with the cylinder in which the piston operates so as to have frictional engagement therewith depending upon the degree of fluid pressure applied.

A more specific object of the invention is to provide a piston seal arranged to flex under fluid pressure into sealing engagement with the wall to be sealed upon fluid pressure being applied thereto and return to normal frictional engagement with said surface upon being relieved of such fluid pressure.

With these and other objects in view, the invention consists of certain novel features of construction as will be more fully described and particularly pointed out in the appended claims.

In carrying out my invention, I provide at each end portion of the piston a seal having an annular lip which is flexible at such a location as to move in an arc to intersect the wall of the cylinder which contains the piston. The lip is spring urged into normal sealing engagement with the cylinder wall and is exposed to the fluid under pressure in the cylinder to be pressed or flexed thereby into frictional engagement with the cylinder wall proportional and in response to the pressure applied. Thus, the greater the fluid pressure, the greater the frictional engagement between the annular lip and the cylinder wall. Upon the removal of said fluid pressure, said lip will return to the normal frictional engagement with said cylinder wall. Thus, in the reciprocation of the piston the degree of frictional engagement of the seal at one end of the piston will increase and the seal at the other end of the piston will decrease. Thus, I am able to provide a fluid-tight seal for varying fluid pressure without undue drag of said seal on the cylinder wall.

Figure 3:
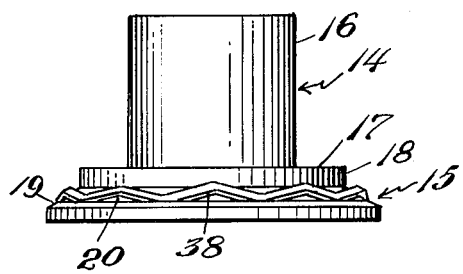
Figure 3 is a side elevational view of a part of the piston shown in Figure 1.

Referring to the drawing for a more detailed description of the invention, 10 designates generally a hydraulic cylinder having a hydraulic piston 11 which is reciprocated in a usual manner by an application of fluid under pressure to one side or the other on the said piston. The piston 11 may be recessed to receive sealing elements designated generally 12 and 13 which project from the piston 11 into fluid-tight engagement with the wall of the cylinder. Preferably, as for reasons of assembly, the piston 11 is made as shown comprising a first sleeve 14 (see Figure 3) having a flange 15 at one end thereof which with the body 16 of the sleeve forms a shoulder 17. The flange 15 is reduced at the shoulder 17 as at 18 and then is tapered outwardly to form an inclined annular shoulder 19 in which there is made an annular groove or recess 20 located with its center at the longitudinal axis of the sleeve.

A spacer sleeve or collar 21 having an annular radial flange 22 centrally disposed thereon is positioned over the body 16 to rest against the shoulder 17. A collar or second flange 23 which is made substantially identical to the flange 15 has a central opening 24 and is received in an inverted position on the body 16 with its shoulder or side 17' resting on the other end of the spacer collar 21. The upper end of the body 16 is spaced inwardly from the outer side of the second flange 23 as at 25. A connecting rod 26 having an enlarged head 27, a threaded portion 28, and a reduced shank 29 is received in the bore 30 of the shank 16 of the sleeve 14, the head 27 resting against the flange 23 and the threaded portion 28 extending beyond the flange 15. A clamp nut or other suitable fastening device 31 engages the threaded portion 28 and in an obvious manner secures the sleeve, collar, and flange to each other in assembled relation. Thus, there is provided a piston in which there is formed substantially identical annular recesses 32, 33.

Figure 1:
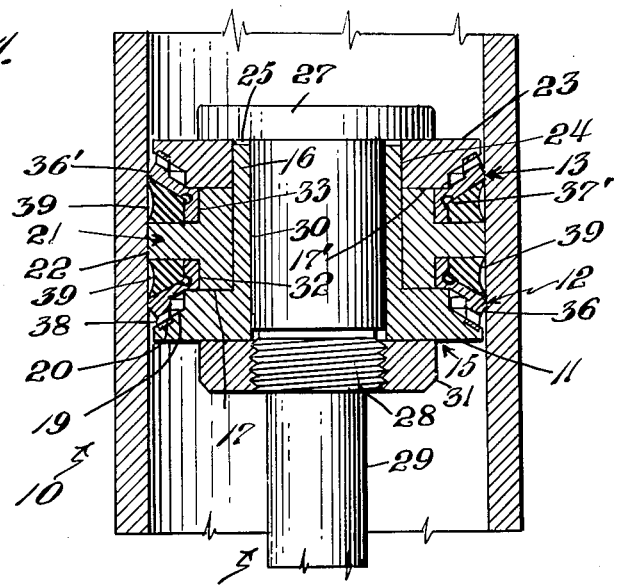
Figure 1 is a central sectional view taken through a cylinder and the pistons thereof and showing a piston seal embodying my invention.
Figure 2:
Figure 2 is a central sectional view of a sealing element shown in Figure 1.

The sealing element 12 (see Figure 2) comprises a ring 34 made of a flexible material which may be employed for a sealing purpose and may be metal or a resin having the necessary flexibility with the particular hydraulic fluid employed for reciprocating the piston. The ring has a body 35 at one end of which there extends an annular lip 36 which is inclined outwardly from the body. An annular groove 37 is provided at the junction of the said lip 36 with the body 35 forming a bending location about which the lip may be flexed. The ring is received in the recess 32 to encircle the collar 21 and the body 35 is clamped in position between the shoulder 17 and flange 22. The annular lip 36 projects into engagement with the wall of the cylinder, and a wavy metal spring washer 38 is received in the recess 20 and projects therefrom into engagement with the annular lip 36 to apply a spring pressure to bias said lip into normal fluid-tight engagement with the cylinder wall. If desired, the lip 36 may be backed by a flexible packing 39 of a resilient material such as rubber, synthetic rubber, or the like.

The sealing element 13 is similar to the element 12 and is received in the recess 33 in the inverted order with respect to the element 12. Like parts of this seal 13 are designed with prime numerals.

The flanges 15 and 23 are spaced from the wall of the cylinder 10, and fluid under pressure will pass by the said flanges and press on the annular lip 36 and tend to swing the same about the groove 37 into increased engagement with the walls of the cylinder in proportion to pressure exerted on the fluid to be sealed. Upon the removal of said fluid pressure on the lip 36, the same with the additional urge of spring 38 will recover to its normal sealing engagement with the wall of the cylinder.

I claim:

1. A fluid seal for a piston and the like reciprocal member comprising a flexible annular lip extending from the piston and having adjacent sides angularly disposed relative to each other and to the wall of the cylinder in which the piston reciprocates and adapted to bear at the junction of said sides against the said wall into sealing engagement therewith, said lip being flexible at a location thereon inwardly of the portion of said lip bearing against said wall and exposed to the fluid pressure in the cylinder acting on said lip in a direction tending to move the same about said location towards said wall with increased friction in response to the said fluid pressure, spring means acting on said lip in a direction substantially axially of said lip to bias the same into normal fluid sealing engagement with said wall, and a yieldable resilient backing for said lip.

2. A fluid seal for a hydraulically reciprocated piston, said piston having a pair of annular recesses extending inwardly from its periphery and inwardly of the ends thereof, a resilient ring member in each of said recesses in fluid sealing engagement with the bottom and adjacent side wall portions of said recesses, each of said rings having an annular lip portion projecting therefrom towards the wall of the cylinder in which said piston is reciprocated and having adjacent sides angularly disposed relative to each other and to said wall and adapted to bear at the junction of said sides against the said wall, said lip being flexible about a location at the junction of the lip portion with the body of said ring and exposed to the fluid pressure in the cylinder acting on said lip in a direction tending to move the same about said location towards said wall with increased friction in response to the said fluid pressure, a spring in each of said recesses acting between the outer wall of the recess and said lip to bias the same into normal sealing engagement with the said wall, and a resilient backing for each of said annular lips.

References Cited in the file of this patent
UNITED STATES PATENTS

| | | |
|---|---|---|
| 1,769,984 | Bockins | July 8, 1930 |
| 1,796,415 | Tyler | Mar. 17, 1931 |
| 1,808,973 | Scharnberg | June 9, 1931 |
| 2,111,312 | Clark | Mar. 15, 1938 |
| 2,196,337 | Loweke | Apr. 9, 1940 |
| 2,250,011 | Dayton | July 22, 1941 |
| 2,522,229 | Jessup | Sept. 12, 1950 |